June 13, 1961  W. P. WATSON  2,987,970
PORTABLE AUTO BODY MILLING TOOL
Filed Jan. 7, 1959  3 Sheets-Sheet 1

INVENTOR.
WILBER P. WATSON
BY *Ely, Frye D Hamilton*
ATTORNEYS

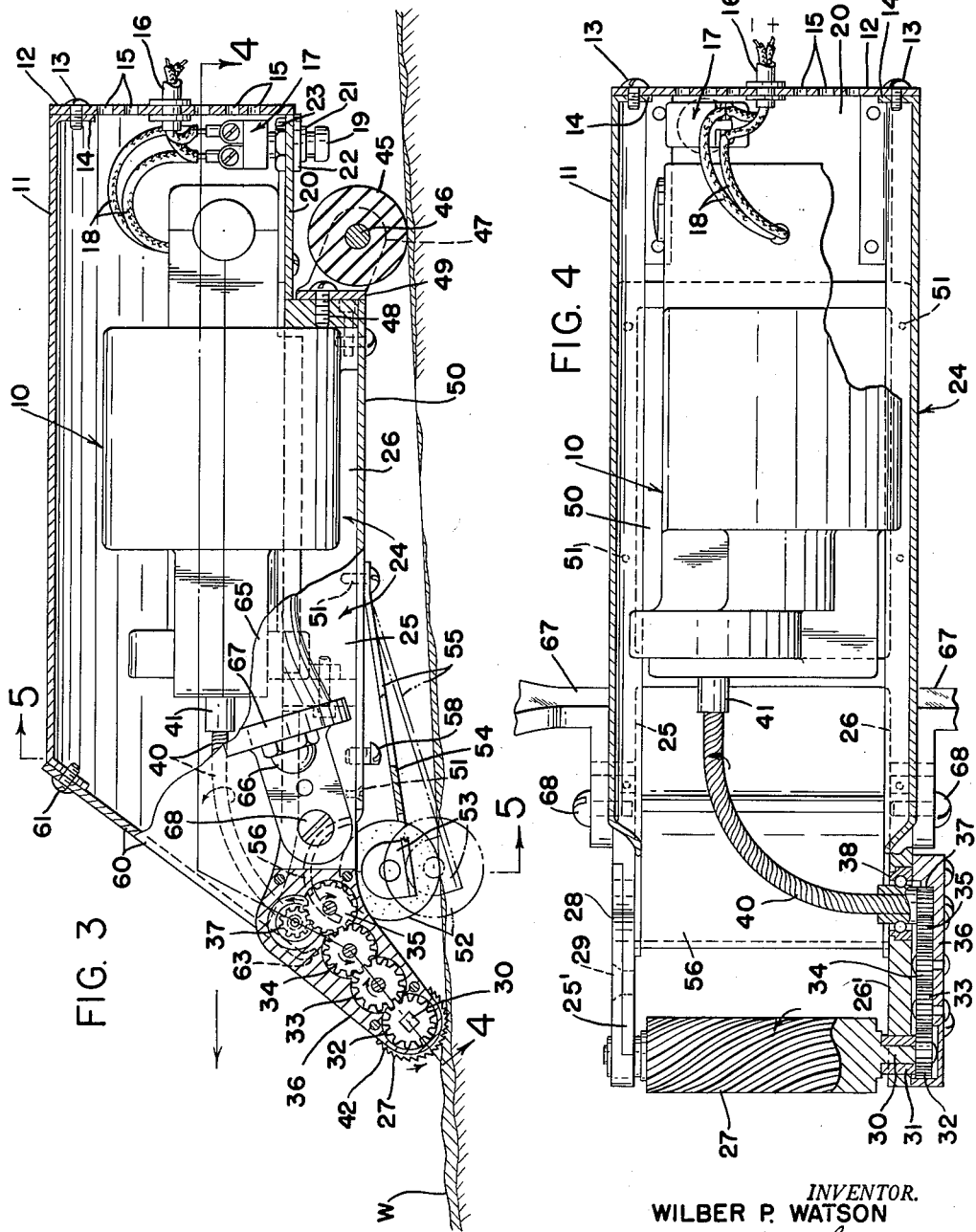

June 13, 1961  W. P. WATSON  2,987,970
PORTABLE AUTO BODY MILLING TOOL
Filed Jan. 7, 1959  3 Sheets-Sheet 3
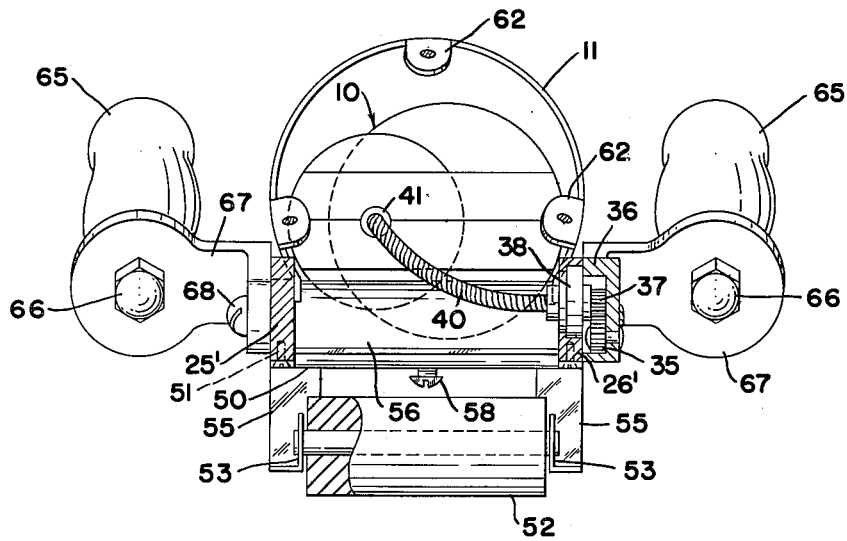
FIG. 5
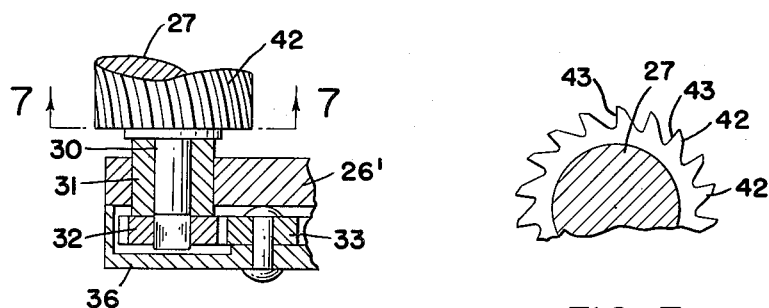
FIG. 6
FIG. 7
INVENTOR.
WILBER P. WATSON
BY
ATTORNEYS though the molten metal can be smoothed to approximate the desired contours, it must be filed or smoothed after solidifying to produce the desired finished contours.

United States Patent Office 2,987,970
Patented June 13, 1961

2,987,970
PORTABLE AUTO BODY MILLING TOOL
Wilber P. Watson, 7 Barberry Road, Wooster, Ohio
Filed Jan. 7, 1959, Ser. No. 785,411
2 Claims. (Cl. 90—12)

The invention relates to portable tools for milling or smoothing irregular surfaces, particularly on automobile bodies and fenders.

In automobile body assembly operations and body and fender repair operations it is usually necessary, in order to make smooth joints between parts or to make the curve from one part flow smoothly into the curve of another, to fill in cracks, joints and depressions with molten lead or other soft metals. While the molten metal can be smoothed to approximate the desired contours, it must be filed or smoothed after solidifying to produce the desired finished contours.

The smoothing operation to produce the finished contours is ordinarily done by hand filing or by a combination of power sanding and hand filing, and in either case it becomes a very laborious and time-consuming operation resulting in excessive cost.

It is a general object of the present invention to provide a novel portable milling tool which will rapidly smooth the surface of filled-in metal on automobile bodies to greatly reduce or substantially eliminate the usual hand filing operation.

Another object is to provide an improved portable milling tool having a self-cleaning rotary milling cutter which is visible to the operator at all times.

A further object is to provide an improved portable milling too which has a self-adjusting supporting roller which accommodates itself to the contour of the work surface.

A still further object is to provide an improved portable auto tool which circulates air from the driving motor to the cutter and surface being worked upon to blow cuttings and scrapings away from the cutter and surface.

These and other objects are accomplished by the improvements comprising the present invention, which includes a motor and gear reducer mounted within a housing for driving a rotary milling cutter journaled at the front end of the housing, the front end of the housing being inclined or beveled to expose the cutter at all times to an operator holding the housing, and there being a supporting roller floatably mounted on the front end of the housing to accommodate itself to the work surface.

A preferred embodiment of the present invention is shown by way of example in the accompanying drawings and described in detail in the following specification. Various modifications and changes in details of construction may be made within the scope of the invention as defined in the appended claims.

Referring to the drawings:

FIG. 3 is a longitudinal sectional view of the improved tool in position on an auto body surface being milled.

FIG 4 is a plan sectional view on line 4—4, FIG. 3, with parts of the side handles broken away.

FIG. 5 is a vertical sectional view as on line 5—5 of FIG. 3.

FIG. 6 is an enlarged fragmentary sectional view of a portion of FIG. 4.

FIG. 7 is a transverse sectional view on line 7—7 of FIG. 6 showing the cutter in elevation.

Figure 1:
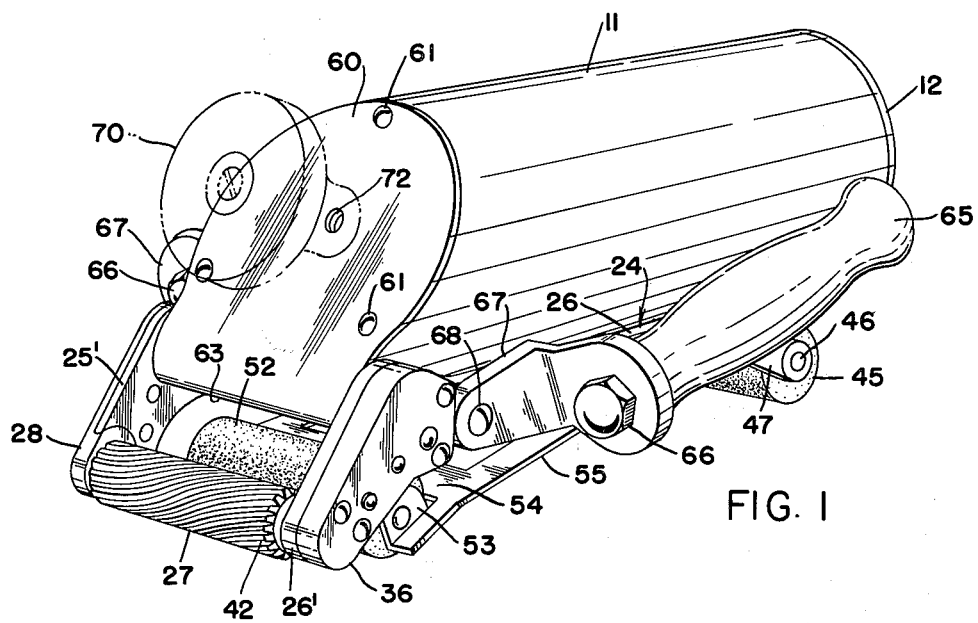
FIG. 1 is a perspective view of the improved tool, showing a detachable auxiliary handle on the front of the housing in phantom lines.
Figure 2:
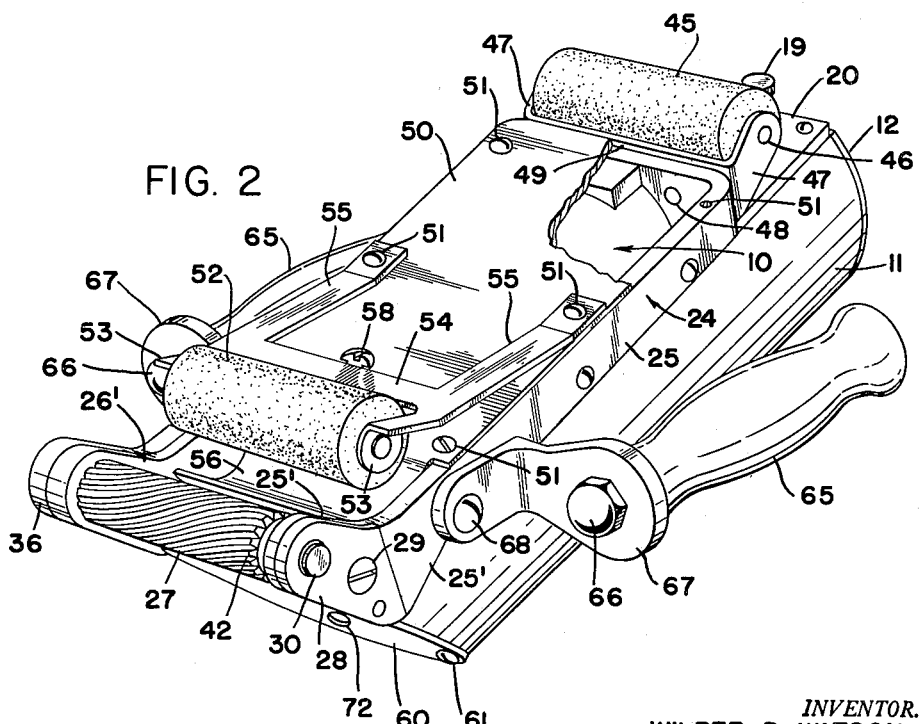
FIG. 2 is a bottom perspective view, with a part of the bottom housing plate partly broken away.

The improved tool is powered by a conventional electric motor and gear reducer unit indicated generally at 10 which is encased in a substantially cylindrical housing 11 preferably of sheet metal or the like. The rear end of the housing is closed by a transverse closure plate 12 which may be attached by screws 13 to flanged ears 14 turned inwardly from the rear end of the housing 11. The plate 13 preferably has a plurality of holes 15 therein to permit cooling air to be drawn into the housing and around the motor 10.

An electrical conductor cord 16 passes through a central hole in the plate 13 for supplying electric current to the motor. A push button switch 17 is connected in circuit with the conductors 18 of the cord 16 and is mounted within the rear end of the housing. The push button 19 of the switch is preferably slidably mounted through a base plate 20 on the rear of the housing by means of a bushing 21 held by suitable nuts 22 and 23.

A rectangular frame, indicated generally at 24, depends from the bottom open side of the housing and extends forwardly under the housing from the front edge of base plate 20 to the front end of the housing. The bottom portion of the motor and gear reducer unit extends downwardly between two side bars 25 and 26 of the rectangular frame 24. The two side bars 25 and 26 are turned or inclined downwardly at the front end of the housing to form mounting bracket arms 25' and 26', respectively, for the milling cutter 27, which is journaled at the extreme front end of the tool and has spirally arranged teeth.

Preferably, the downward arm 25' is rabbeted along the side and notched out at the end to receive a detachable bracket plate 28 secured to the arm 25' by a screw 29. The shaft 30 of the milling cutter 27 is journaled at one end in the bracket plate 28 so that the cutter can be removed by removing the plate 28. The other end of the shaft 30 is journaled in a bearing bushing 31 in the arm 26', as best shown in FIG. 6.

The downturned angular bracket arms 25' and 26' provide for mounting cutter 27 immediately under front end of housing so that when held by the operator in use the weight of the housing may be balanced so that it exerts a direct downward thrust on the cutter instead of a rocking or lever action which would occur if the bracket arms extended straight forwardly from the housing.

The shaft 30 has a pinion gar 32 secured on its outer end, and the pinion 32 is driven by a train of gears 33, 34 and 35 mounted in a cap plate 36 secured to the side of the arm 26'. Gear 35 meshes with a driving pinion 37 which is preferably journaled in an anti-friction bearing 38 in the arm 26' and which has a socket for receiving and connecting with a flexible drive shaft 40 secured at its other end to the driven shaft 41 of the motor and gear reducer unit 10. The speed of the gear reducer shaft 41 may be about 2200 r.p.m. and the speed of the milling cutter 27 may be about 1750 r.p.m. As viewed in FIG. 3, the milling cutter 27 is rotated counterclockwise.

Referring to FIGS. 6 and 7, the spirally arranged cutting teeth 42 of the cutter 27 are formed so that in cross section the cutting face 43 of each tooth is flat and extends substantially radially of the cutter, and there is no overhang at the outer edges of the teeth. This construction eliminates clogging of the teeth by the cuttings or scrapings from the work surface which occurs with conventional cutters with undercut teeth having an overhanging outer edge.

The rear end of the housing 11 is provided with a supporting roll 45 which may be made of wood, rubber, plastic or any other suitable material. Preferably, the roller 45 has a shaft 46 which is journaled at its ends in the ears 47 of a U-shaped bracket 49 attached to the rear end of the frame 24, as by screws 48. A bottom cover plate 50 is attached to the body of frame 24 by screws 51.

A front support roller 52 is movably mounted preferably on the underside of the cover plate 50 and is located at the front end of the housing behind the cutting roller 27. Preferably the roller 52 is journaled in bracket ears 53 formed on the front end of a U-shaped spring frame having a front cross bar 54 and rearwardly extending legs 55 of spring steel, the rear ends of which are preferably attached to the cover plate 50 by screws 51 preferably threaded into the side rails 25 and 26 of the frame 24.

The front end of the cover plate 50 is curved upwardly between the arms 25' and 26' to form a recessed portion 56 for receiving the roller 52 when it is retracted upwardly against the tension of the spring legs 55. Thus the supporting roller 52 has a floating or self-adjusting mounting on the underside of the frame 24 to allow the roller to accommodate itself to variations in contour of the work surface, as indicated in FIG. 3. When it is desired to hold the supporting roller 52 within the recess 56, as in milling a sharply convex surface, the flatted screw 58 may be rotated to engage under cross bar 54 and hold the roller in retracted position.

The front end of the cylindrical housing 11 is enclosed by a rearwardly inclined front cover plate 60 substantially in the plane of the upper edges of bracket arms 25' and 26' and attached by screws 61 to inwardly bent ears 62 on the front end of the cylindrical housing. The bottom edge of the cover plate is preferably curved slightly rearwardly as indicated at 63 and terminates opposite the front edge of the recessed portion 56 of the bottom cover plate, so as to form a slot for discharging the cooling air circulating through and around the motor in a direction to blow the cuttings and scrapings away from the back of the cutter 27 and work surface.

The bottom edge 63 of the front cover plate is spaced rearwardly of the milling cutter 27, and the rearward inclination of the plate 60 is such that the operator holding the tool can always see the cutter clearly from above the housing as the cutter engages the work surface W. A pair of handles 65 is mounted one at each side of the tool, so that the operator can apply balanced pressure on the tool with both hands. Preferably, the handles are mounted at their front ends by studs 66 on angle brackets 67 attached by screws 68 to the side bars 25 and 26 of the bottom frame 24. For certain classes of work it may be desirable to use a front handle such as indicated in phantom lines at 70 in FIG. 1, and a screw hole 72 is provided in the front plate for attaching such an auxiliary handle.

It will be apparent from the foregoing description that a compact and practical tool is provided by the present invention for milling or smoothing surfaces on automobile bodies and fenders. In operation, the forwardly extending milling cutter is visible to the operator at all times and the cutter does not become clogged with cuttings or scrapings from the workpiece. The self-adjusting or floating front roller accommodates itself to various contours and may be positively held in retracted position when milling sharply convex surfaces.

What is claimed is:

1. A hand milling tool for milling auto body surfaces including a housing having a substantially flat bottom surface to be applied to a body surface, an electric motor mounted within the housing, a pair of downturned angular bracket arms on the front end of said housing extending below said flat bottom surface, a rotary milling cutter journaled in said arms and operatively connected to said motor, hand gripping means attached to said housing whereby said tool is balanced therebetween, the angle of said bracket arms being such that the weight of the housing when held by the operator through said gripping means may be so balanced as to exert a direct downward thrust on said cutter, and the front end of said housing being inclined rearwardly substantially in the plane of the upper edges of said bracket arms to expose the cutter to the view of the operator from above and to the rear of the front end of said housing.

2. A hand milling tool according to claim 1 in which a resiliently floating bracket is mounted on the bottom of said housing rearwardly of said milling cutter, and a supporting roller is journaled in said bracket under the front portion of said housing.

References Cited in the file of this patent

UNITED STATES PATENTS

| | | |
|---|---|---|
| 839,128 | Fletcher | Dec. 26, 1906 |
| 1,023,406 | Ackerman | Apr. 16, 1912 |
| 1,670,851 | Ferrara | May 22, 1928 |
| 1,786,096 | Thielmann | Dec. 23, 1930 |
| 2,264,278 | Danforth | Dec. 2, 1941 |
| 2,277,236 | Kneisley et al. | Mar. 24, 1942 |
| 2,431,613 | Hedemark | Nov. 25, 1947 |
| 2,625,860 | Plester | Jan. 20, 1953 |

FOREIGN PATENTS

| | | |
|---|---|---|
| 16,524 | Great Britain | Aug. 5, 1908 |
| 158,572 | Great Britain | Mar. 2, 1922 |